UNITED STATES PATENT OFFICE.

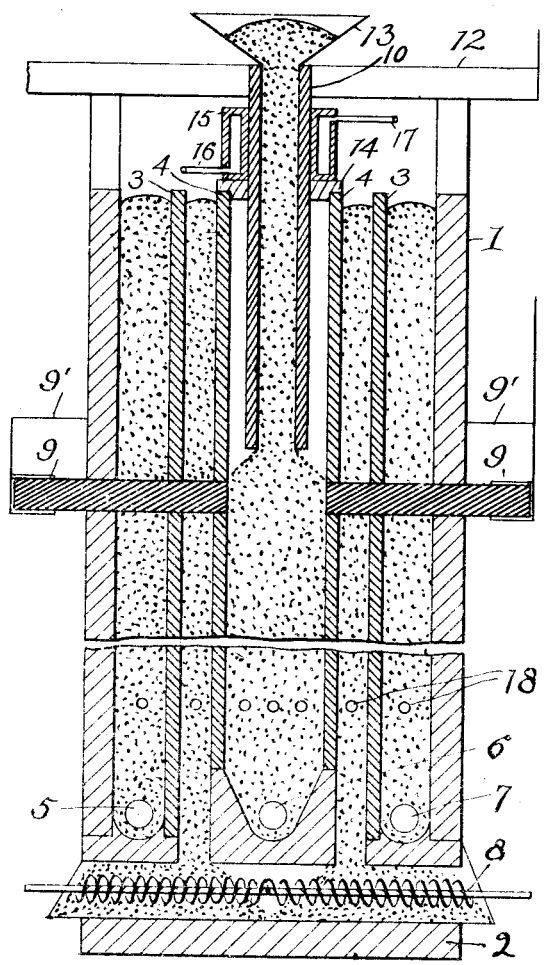

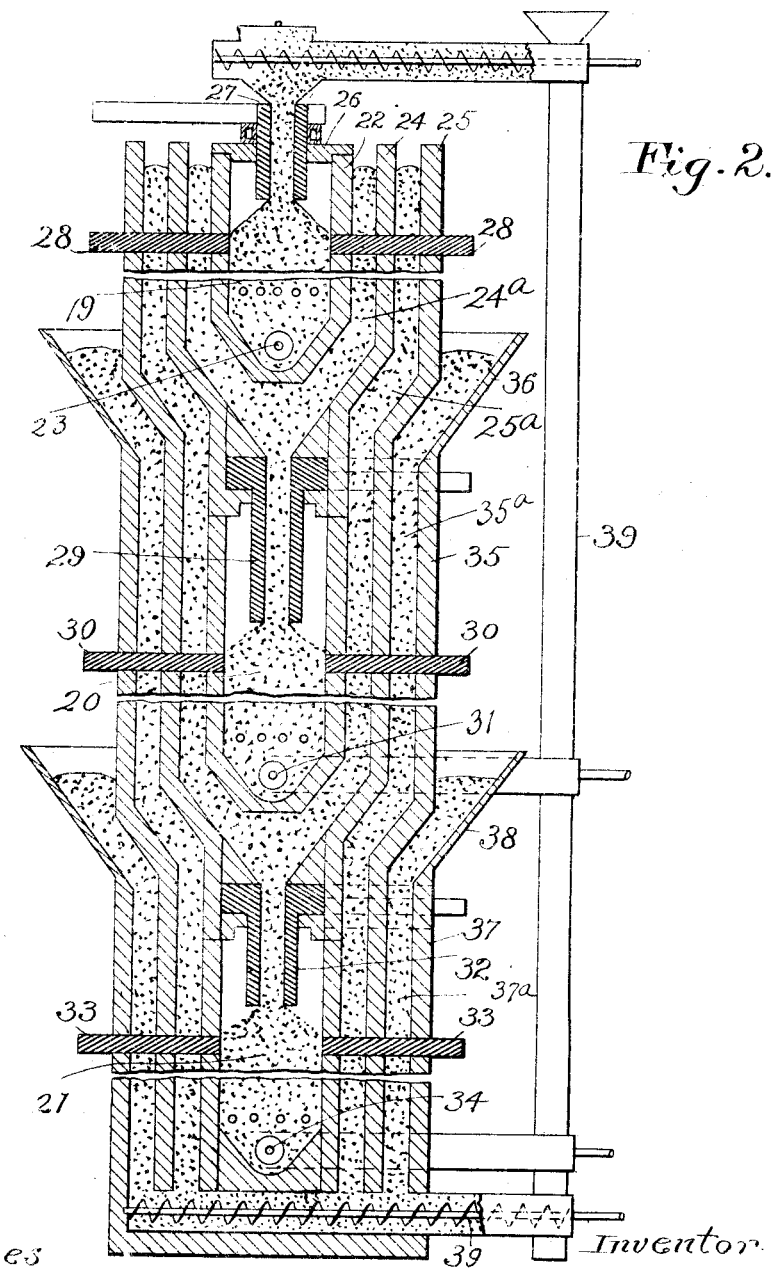

JOHN W. BROWN, OF LAKEWOOD, OHIO, ASSIGNOR TO NATIONAL CARBON COMPANY, OF CLEVELAND, OHIO, A CORPORATION OF NEW JERSEY.

FURNACE.

1,067,795.  Specification of Letters Patent.  Patented July 22, 1913.

Application filed December 1, 1911. Serial No. 663,315.

*To all whom it may concern:*

Be it known that I, JOHN W. BROWN, a citizen of the United States, residing at Lakewood, in the county of Cuyahoga and State of Ohio, have invented a certain new and useful Improvement in Furnaces, of which the following is a full, clear, and exact description.

This invention relates to a furnace for the heating of substances. It is more particularly intended for the heating or calcining of granular or finely divided carbon.

In the furnace herein shown and described, a plurality of distinct and separate charges of material may be simultaneously treated in the furnace, and the heat radiating from the body of material to which heat is applied will be conducted to and absorbed by the other charges of material, as the heat passes through them.

In its broad sense, the invention consists in heating a body of material and causing an enveloping body of material to be treated, to pass outside of and along the chamber containing the first mentioned charge to be heated. The movement of the envelop of material causes the continual heating of fresh supplies of material, thereby utilizing the heat radiating from the body of material to which heat is applied, and by so much reducing the losses of heat due to radiation and to necessary cooling before removal from the furnace, to a minimum.

Generally speaking, the invention comprises the elements and combinations thereof set forth in the accompanying claims.

Reference should be had to the accompanying drawings forming a part of this specification in which—

Figure 1 is a central vertical section of a furnace embodying my invention; and Fig. 2 is a central vertical section of a modified form of furnace.

The inclosing walls of the furnace which are made of suitable refractory material, preferably non-conducting, are represented at 1, the bottom of the furnace being shown at 2. Within the outer walls 1 are concentrically arranged walls 3 and 4,—these walls extending substantially coincident in height with the walls 1. It will be apparent that the space between the outer walls 1 and the walls 3 forms a chamber; likewise the space between the walls 3 and 4, and the space within the walls 4. Into these three chambers material to be treated may be fed in any desired manner; and at the bottom of each chamber means are provided for removing the material from the bottom of the chamber, thereby insuring that the material fed to the various chambers will progressively move through the chambers. The moving means may be screw conveyers, as represented at 5, 6, 7 and 8. The rotation of these conveyers may be easily controlled, so that the movement of the material through the various chambers may be at any rate required, for the purpose of producing the effects in the material being treated, which may be desired. The heating of the material within the central chamber may be accomplished in a variety of ways, and I have shown an arrangement whereby the charge may be heated by the electric current. For this purpose, I provide the electrodes 9 and 10, the electrode 9 being connected with a suitable conductor, as indicated at 11, and the two electrodes 9 being connected by a bus bar or cable 9′, the electrode 10 being electrically connected with a bus bar 12.

The material may be fed into the various chambers in any desired manner, but in introducing the material into the central chamber, I have done so by forming the electrode 10 as a hollow electrode, and introducing the material through this eletrode by means of a suitable hopper secured at the upper part of the electrode, as indicated at 13. The charge descending through the electrode 10 will spread out as it leaves the lower end of this electrode and fill the chamber, so that there is a quantity of material forming a path for the current between the electrodes 9 and 10. Coöperating with the walls 4 is a cover 14, which incloses the space within the central chamber above the level of the charge, thereby providing a chamber in which the vapors and gases generated by the heat of the charge within the chamber may be condensed and, if desired, means may be provided for conducting away these gases and vapors and also for removing the condensed material. Outside of the cover 14, the electrode 10 may be cooled by any suitable device, as is indicated at 15,—the same being a hollow collar fitting around the electrode and provided with pipes 16 and 17 through which some suitable cooling fluid may be circulated around the collar 15. Pipes 18 extend through the various chambers near the lower portions thereof to assist in the cooling of the material before the same is removed from the chambers. In this manner, the material may be reduced to a temperature such that it will not oxidize when brought into the air after having been heated in the furnace. The material within the innermost chamber will radiate a certain amount of heat which will be conducted through the walls 4, and will be absorbed by the material within the chamber which surrounds the central chamber. This material will, in turn, radiate a certain amount of the heat it receives. This heat being conducted through the walls 3, will be absorbed by the material contained in the chamber between the walls 1 and 3. As before stated, the rate of movement of the material in each of the chambers may be independently governed so that the material in any given chamber can be moved at a rate such that the material may be subjected to the heat for any desired length of time. For example, the charge in the central chamber may pass through the chamber at such a rate that it will be completely converted to graphite; that is to say, being heated to something over 2000°. If the charge within the chamber surrounding the central chamber be moved slowly, it may be possible to heat the material within the surrounding chamber from 1500° to 1800°, by the means of the heat radiated from the central chamber. The material within the outermost chamber may, in turn, be moved at such a rate as to heat the same to a temperature varying from 1000° to 1200°, and, if desired, other concentric chambers may be provided, through which material may be passed so that the heat radiating from the central chamber will be practically all adsorbed by the various charges and thus be conserved. Granular carbon, such as might be heated from 1500° to 1800° in the chamber surrounding the central chamber is useful in a number of instances, and the same would be true of carbon material heated from 1000° to 1200° in the outermost chamber. And it will be perfectly apparent that the material which had been heated in its passage through the chambers surrounding the heating chamber may be retreated, if such is desired, and, by this previous heating, a great saving will be effected in that as the material is hot, it will not require so much heat to raise the material to the desired temperature. This reheating may be accomplished by passing the material heated in any of the concentric chambers through the central or heating chamber, or the material previously passed through the outer chamber may be passed through the chamber nearer the heating chamber. As will be apparent, various means may be used to handle the material in this way, and in Fig. 2, one such way is shown.

In Fig. 2, there is disclosed a modified form of furnace, in which furnace the material passing through the chambers surrounding the first heating chamber is, in turn, introduced into a heating chamber and subjected to a high heat. In this figure, there are a series of central heating chambers 19, 20, and 21, preferably placed one above the other in order that the charges of material within these chambers may, by gravity, pass through the same. The chamber 19 is inclosed by walls 22, and at the bottom of the chamber there is located a conveyer or similar device 23 by which the material may be caused to move through the chamber. Surrounding the wall 22 and spaced therefrom are walls 24 which inclose the chamber 24$^a$, and outside of the walls 24 and spaced therefrom are walls 25 providing the chamber 25$^a$. Coöperating with the walls 22 is a cover 26 which incloses the chamber 19 and forms a condensing chamber at the top of this chamber in the same manner as explained with relation to Fig. 1. Through the cover there extends the hollow electrode 27 in the same manner as explained with regard to Fig. 1, which, in conjunction with the double electrode 28, forms terminals for the introduction of the electric current through the heating chamber. The heating chamber 20 is in communication with the chamber 24$^a$. The material passing through this chamber is fed through the hollow electrode 29 in the same manner as material is fed into the chamber 19 through the hollow electrode 27. An electrode 30 also extends into this chamber 20, for the purpose of introducing in conjunction with the electrode 29, the electric current, into the chamber. In the lower part of the chamber 20 there is a conveyer 31, by which the material may be removed from the lower part of the chamber, which thereby causes the movement of the material being treated through the chamber 24$^a$ and the chamber 20. The conveyers 31 and 34 may operate as suggested to remove the material from the respective heating chambers with which they are associated, or these conveyers may by connection with the conveyer 39, deliver the material thereto, which in turn delivers it to the heating chamber 19. This arrangement is used when heat is not applied directly to the material within the chambers 20 and 21. The walls 25 support the electrode 32, as it projects into the chamber 21. This electrode 32 is hollow and communicates with the lower portion of the chamber 25$^a$. There is also an electrode 33 which projects into the chamber 21, and in conjunction with the electrode 32 introduces the electric current into the chamber 21. In the lower part of the chamber 21 there is a conveyer 34 by which the material is removed from the chamber 21, thereby causing the movement of the material through the chambers 25 and 21. Surrounding the walls 25 at the portion thereof where they parallel with the walls of the chamber 20 are walls 35 which are spaced from the walls 25, thereby providing a chamber 35ª. At the upper part, these walls 35 are flared into a hopper shape, as indicated at 36, to aid in the introduction of material to be treated. Surrounding the lower portion of the walls 35 and spaced therefrom are walls 37 which provide the chamber 37ª. The walls 37 are flared at their upper ends into a hopper shape, as indicated at 38, to aid in the introduction of material to be treated. Communicating with both chambers 35ª and 37ª at the lower portions thereof is a conveyer 39, whereby the material may be drawn from the lower parts of these chambers, and thereby cause the passage of the material through the chambers. From the description, it will be seen that the material which passes outside of the chamber 19 will absorb the heat radiating or conducted therefrom, in a measure dependent upon the rate of movement of the material through the chamber 24ª. That is to say, the material in the chamber 24ª may be heated to the maximum amount which is possible from the heat radiating from the walls of the chamber 19, or it may be heated to any degree less than that, dependent upon the rate of movement of the material. This material thus preliminarily heated, passes into the chamber 20, where it is heated to any desired degree in excess of the temperature at which it is introduced into the chamber. In this manner a great saving is effected in the amount of heat required in the chamber 20 to produce the desired result. The material passes through the chamber 25 will in turn by radiation and conduction of the heat from the material passing through the chamber 24, and, as will be seen, the material passes along the walls of the chamber 25 so that it is in a position to absorb the heat directly radiated from the chamber 20, thus heating the material to a higher temperature than that temperature at which it first comes into contact with the walls of the chamber 25. This material passing on through the chamber 25ª eventually passes into the chamber 21, where it may be directly heated, as heretofore explained, and raised to such a temperature as may be desired. Material may be introduced through the hopper 36 into the chamber 35ª and also through the hopper 38 into the chamber 37ª, the material thus introduced being heated by the heat radiated from the material within the chambers 20 and 31, in a manner similar to that which has heretofore been described.

As will be apparent, a furnace of the type described, may be constructed with any desired number of heating chambers,—the material being introduced into these respective heating chambers in the manner indicated and described.

Having thus described my invention, what I claim is:

1. A furnace having a chamber adapted to contain material to be heated, means for passing a moving envelop of material to be treated upon the outside of the chamber and past the heating zone of the chamber, whereby the heat radiating from the material within the chamber will be conducted to and absorbed by the material comprising the envelop, and means for heating the material within the said chamber.

2. A furnace having a chamber adapted to contain material to be heated, means for passing a moving envelop of material to be treated upon the outside of the chamber and past the heating zone of the chamber, whereby the heat radiating from the material within the chamber will be conducted to and absorbed by the material comprising the envelop, said means being adapted to vary the rate of movement of the said envelop of material and means for heating the material within said chamber.

3. A furnace having a chamber adapted to contain material to be heated, means for passing a plurality of concentrically arranged and moving envelops of material to be treated upon the outside of the chamber and past the heating zone of the chamber, the said material comprising the envelops absorbing the heat which is radiated and conducted from the material within the said chamber, and means for heating the material within the said chamber.

4. A furnace having a chamber adapted to contain material to be heated, a plurality of envelops of material to be treated moving upon the outside of the chamber, means whereby the rate of movement of each of the envelops of material may be independently regulated, and means for heating the material within the said chamber.

5. A furnace having a plurality of concentrically arranged chambers, separate conveyer means associated with each chamber for moving the material within the chambers through the said chambers, means for heating the material within one of said chambers, the heat from said material radiating successively through the material in said chambers.

6. A furnace having a plurality of concentrically arranged chambers, separately operable conveyer means associated with the lower parts of each chamber whereby the movement of the material through said chambers may be independently manipulated, means for heating the material in the innermost chamber, the heat from said material radiating successively through the material within the surrounding chambers.

7. A furnace having a plurality of concentrically arranged chambers each adapted to receive a separate charge of material, means associated with each chamber for moving the material therein through the chamber, whereby the rates of movement of material through the chambers may be varied and controlled, and means for heating the material within the central chamber, the heat from said material radiating successively through the material in the surrounding chambers.

8. A furnace having a plurality of concentrically arranged chambers, means for moving the material within the chambers and past the heating zone of the heating chamber through the said chambers, means for heating the material in the innermost chamber, the heat from said material radiating successively through the material within the surrounding chambers, and means for cooling the material in the chambers before the same is removed therefrom.

9. A furnace having a plurality of concentrically arranged chambers, said chambers being adapted to contain material to be heated, a conveyer associated with each chamber below the heating zone therein, whereby material is caused to move through the chambers, means for heating the material in the innermost chamber, the heat from said material radiating successively through the material within the surrounding chambers.

10. A furnace having an outer wall and a plurality of concentrically arranged walls within the outer wall, thereby forming independent concentric chambers, means associated with each chamber for moving material contained therein through the chamber, and means for heating the material within the innermost chamber.

11. A furnace having a chamber adapted to contain material to be heated, means for heating material within said chamber, means for passing a moving envelop of material to be heated upon the outside of the said chamber, a second heating chamber to which the material in the moving envelop is conducted, and means for heating the material within the last mentioned chamber.

12. A furnace having a central chamber and a second chamber surrounding the central chamber, means for heating the material within the central chamber, means for moving the material through the second mentioned chamber, a third chamber which connects with and receives material from the second chamber mentioned, and means for heating the material within the third chamber.

13. A furnace having a plurality of heating chambers, one above the other, concentric chambers surrounding the uppermost of said chambers, each of said concentric chambers being connected with a separate heating chamber, means for moving the material within the chambers through the same, and means for heating the material within the heating chambers.

In testimony whereof, I hereunto affix my signature in the presence of two witnesses.

JOHN W. BROWN.

Witnesses:
F. D. LAURENCE,
RICHARD H. HAWSEY.